United States Patent [19]
Strybel

[11] 3,965,572
[45] June 29, 1976

[54] TUBE CUTTER

[75] Inventor: Richard V. Strybel, Elk Grove Village, Ill.

[73] Assignee: Imperial-Eastman Corporation, Chicago, Ill.

[22] Filed: Oct. 21, 1975

[21] Appl. No.: 624,555

[52] U.S. Cl. .................................. 30/102; 81/136; 81/156; 269/181

[51] Int. Cl.² .................. B23D 21/08; B25B 13/16; B25B 5/22

[58] Field of Search ............... 30/101, 102; 81/135, 81/136, 137, 156, 175, 176; 269/181, 182

[56] References Cited
UNITED STATES PATENTS

| | | | |
|---|---|---|---|
| 2,582,406 | 1/1952 | Bachli et al. | 30/102 |
| 2,629,926 | 3/1953 | Franck | 30/102 |
| 2,941,291 | 6/1960 | Fritch | 30/102 |
| 3,100,934 | 8/1963 | Jonasson | 30/102 |
| 3,118,227 | 1/1964 | Samuels et al. | 30/102 |
| 3,145,469 | 8/1964 | Petersen | 30/102 |
| 3,376,638 | 4/1968 | Bjalme et al. | 30/102 |

Primary Examiner—Othell M. Simpson
Assistant Examiner—James G. Smith
Attorney, Agent, or Firm—Wegner, Stellman, McCord, Wiles & Wood

[57] ABSTRACT

A manually operable tool, such as a tube cutter, having a working element carried on a carrier adjustably positioned on a mounting element. An improved arrangement of threaded advancing structure and selectively positionable pawl structure is provided to permit automatic release of the pawl at opposite ends of travel of the carrier for facilitated use of the tool. Automatic release of the pawl is effected by means of the provision of spaces at the opposite ends of the carrier thread permitting a biasing spring to reposition the pawl suitably for quick, nonthreading reverse movement.

20 Claims, 5 Drawing Figures

U.S. Patent June 29, 1976 3,965,572
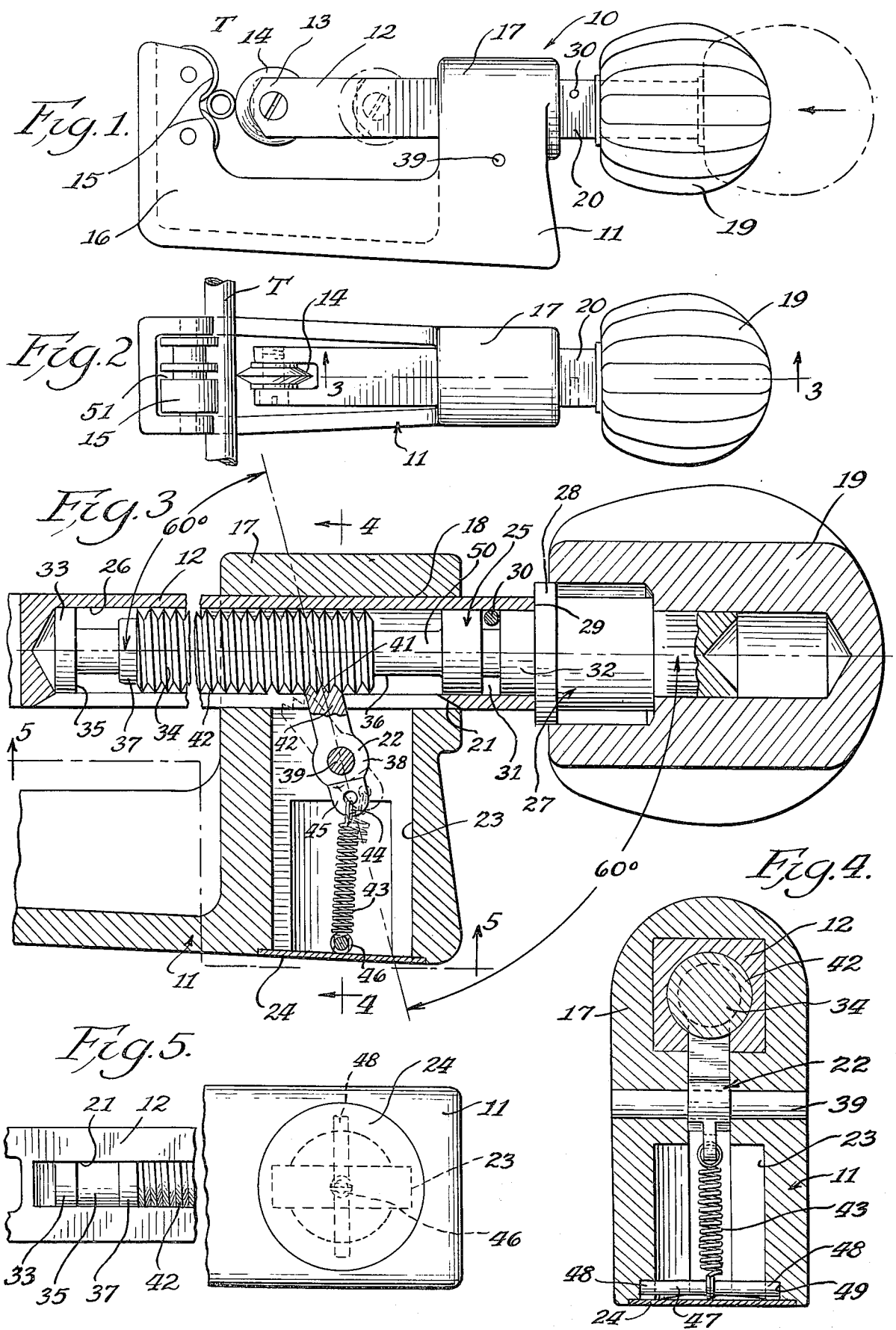

TUBE CUTTER

BACKGROUND OF THE INVENTION

1. Field of the Invention

This invention relates to tools, and in particular to manually operable tools, such as tube cutters.

2. Description of the Prior Art

One improved form of tube cutter is illustrated in George E. Franck U.S. Pat. No. 2,787,054, owned by the assignee hereof. As shown therein, the cutting wheel is carried on a support member which is slidably received in a collar portion of the mounting element body. The support member is selectively positioned in the collar by means of a ratchet tooth and pawl structure. The cutter wheel is carried on a mounting element, or actuating rod, which is moved longitudinally through the support member by means of a knob connected to the actuating rod and threaded to the outer end of the support member.

To provide quick movement of the support member to and from the tube supported on opposed backup rollers, the pawl is urged away from the ratchet teeth by manipulation of a pair of knurled knobs at opposite sides of the collar.

The use of such manually operable means for providing fast movement of a threaded element in such a tool is quite common. Thus, in U.S. Pat. No. 288,722 of Edward L. Morris, a vise is shown having a manually operable lever for engaging and disengaging the tool advancing teeth.

Atwater E. Brockett, in U.S. Pat. No. 575,687, shows a portable vise having a pawl G adapted to be manually engaged with the thread of the vise advancing means.

In Atwater E. Brockett U.S. Pat. No. 575,688, the pawl is provided with finger-pieces permitting it to be lifted out of engagement with the rack against the force of a biasing spring tending to keep the pawl locked to the rack.

The pipe cutter of Albert Katzki, shown in U.S. Pat. No. 680,866, utilizes a pawl having a thumb-piece which may be pressed to disengage the pawl from the teeth of the cutting wheel advancing rod.

David Kilgour, Jr., in U.S. Pat. No. 1,380,653, shows a pipe cutter having a threaded adjustment member for selectively engaging and disengaging the pawl from the advancing member.

David Kilgour, Jr., in U.S. Pat. No. 1,505,205, shows a pipe cutter having a locking block having a manual operating portion for effecting the desired disengagement of the pawl.

The quick-adjustable clamp of Henry M. Svebilius, in U.S. Pat. No. 1,515,286, includes a pair of manually operable levers for pivotally adjusting the cooperating female thread element.

George D. Manville, in U.S. Pat. No. 2,071,756, shows a pipe cutter having a manually operable thumb button for effecting the desired pawl control.

Herman Bachli et al., in U.S. Pat. No. 2,582,406, show a tube cutter having a large cam operated by a manually operable handle.

Clyde E. Wright, in U.S. Pat. No. 3,022,575, shows a tubing cutter having a handle for manually operating the pawl.

Axel V. Jonasson, in U.S. Pat. No. 3,100,934, shows a pipe cutter having a spring biased manually operable handle integral with the thread engaging pawl.

Abraham M. Samuels et al., in U.S. Pat. No. 3,118,227, shows a tube cutting device having a manually operable handle for releasing the pawl.

In U.S. Pat. No. 3,145,469, Thowald Petersen shows a pipe cutter having a manually operable handle integral with the pawl.

Bengt G. Bjalme et al. show, in U.S. Pat. No. 3,376,638, a pipe cutter having a half nut guided for movement toward and away from the pressure screw.

Robert C. Reese et al., in U.S. Pat. No. 3,403,442, show a device for scoring glass articles having a manually operable release bar.

SUMMARY OF THE INVENTION

The present invention comprehends an improved manually operable tool, such as a tube cutter, wherein means are provided for automatically releasing the ratchet pawl from the threaded element at opposite ends of the threaded element travel and permitting the thusly released pawl to ride over the thread in moving the threaded element to its opposite extreme position. Thus, no additional manipulating means need be provided in the present tool for permitting the desired quick movement of the tool-carrying carrier to and from the work, thereby providing an improved facilitated operation.

In the illustrated embodiment, the pawl positioning means includes means for biasing the pawl to a preselected position at the opposite ends of travel of the threaded element. The pawl is mounted so as to be automatically repositioned by a movement of the carrier toward the opposite end of its travel to permit the thread to slide past the pawl and thus provide a quick adjustment operation.

In the illustrated embodiment, the pawl member is urged to a position substantially perpendicular to the axis of the threaded member at the ends of the threaded portion thereof and to permit such disposition, the threaded member is provided with recesses defining spaces into which the pawl toothed portion may move. Reverse movement of the threaded member may then be effected causing a pivoting of the pawl away from the thread so as to permit a facilitated sliding of the thread past the pawl to the opposite extreme of the threaded member movement.

The invention may utilize standard V-thread means obviating the expensive buttress and special threads of the prior art structures. The selective positioning of the pawl is obtained by the use of a single tension spring further facilitating manufacture of the tool and minimizing cost thereof.

In one aspect, the invention comprehends providing a quick advance of the threaded element by permitting the pawl to swing beyond its normal thread engaging position at the end of the travel of the threaded element.

The invention is illustrated herein with respect to a tube cutter, although, as will be obvious to those skilled in the art, it may be utilized with any form of tool requiring a selective advance and withdrawal of the tool element relative to the work and, thus, may be used additionally illustratively as advancing means in a clamp or vise, etc.

The present invention further comprehends an improved tube cutting operation by means of the improved pawl control means in causing the pawl to provide increasing reaction force against advance of the feed screw so as to limit the force of the cutting wheel against the tube wall. This reaction force varies directly with the resistance afforded by the workpiece and thus provides an automatic improved control of the cutting operation to prevent lockup of the cutter on the tube, preventing the desirable swinging of the tool about the tube in the conventional tube cutting operation. Thus, the tube cutter is well adapted for use with hard tubes. Such operation not only prevents undesirable deformation of the tube, but extends the useful life of the cutting wheel by reducing wear thereof and effectively preventing breakage.

The threaded advancing member may include cylindrical bearing portions outwardly of the threaded portion for coaxially supporting the advancing member in the mounting means against the radial force generated by the pawl.

The present invention further contemplates the provision of a groove at the backup roller accommodating the burr formed by the cutting wheel acting against the tube material in the cutting operation. By preventing the urging of the burr back into the cut slot, as may occur in conventional tube cutters, binding of the cutter wheel is effectively avoided to provide a further improved tube cutting action.

Additionally, the provision of the groove in the backup roller permits the use of the tool with smaller diameter tubing than is permitted in conventional tube cutters, thereby extending the range of usefulness of the tube cutter.

The invention further contemplates the provision of an annular shoulder at one end of the threaded portion to provide an initial pivoting of the pawl suitable to prevent jamming of the pawl in the first portion of the thread upon reverse operation of the tool.

Thus, the tube cutter of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a manually operable tool comprising a tube cutter enbodying the invention;

FIG. 2 is a top plan view thereof;

FIG. 3 is a fragmentary enlarged longitudinal section thereof taken substantially along the line 3—3 of FIG. 2;

FIG. 4 is a transverse section taken substantially along the line 4—4 of FIG. 3; and FIG. 5 is a fragmentary view partially in section taken substantially along the line 5—5 of FIG. 3.

DESCRIPTION OF THE PREFERRED EMBODIMENT

In the exemplary embodiment of the invention as disclosed in the drawing, a tool generally designated 10 is shown to comprise a manually operable tool, such as a tube cutter, having a body, or mounting element, 11. Slidably carried on the body is a carrier 12 having an end portion 13. A cutter wheel 14 may be mounted to carrier portion 13 for engaging a tube T supported by a pair of backup rollers 15 carried on a support portion 16 of the body.

The body further includes a collar portion 17 provided with a through opening 18 slidably receiving carrier 12 for longitudinal movement. Such movement of the carrier is effected by a manipulating element 19 illustratively comprising a rounded knob disposed at the outer end 20 of the carrier.

The carrier, as best seen in FIG. 3, is provided with a slot 21. A pawl 22 is mounted to body 11 within a cavity 23 thereof selectively closed by a closure plate 24 and opening to the through opening 18 of collar portion 17. Pawl 22 is adapted to engage a threaded member generally designated 25 which extends longitudinally through an elongated cylindrical recess 26 and provided at its outer end with a mounting portion 27 for carrying knob 19. Mounting portion 27 may include a thrust collar 28 bearing against the distal end 29 of carrier 12. The threaded member is locked against longitudinal movement relative to the carrier by a pin 30 extending chordally across recess 26 to be received in an annular recess 31 in an outer bearing portion 32 of member 25. The inner end of member 25 is provided with an annular bearing portion 33, with each of bearing portions 32 and 33 having a slide fit in the recess 26 for coaxially rotatably supporting the threaded member 25 therein.

Member 25 further includes a threaded portion 34, an inner annular recess 35, and an outer annular recess 36 between bearing portions 32 and 33, as best seen in FIG. 3. Member 25 further defines an annular shoulder portion 37 at the outer end of recess 35.

As best seen in FIG. 3, pawl 22 includes a midportion 38 pivotally mounted to body 11 by a pivot 39. One end 40 of the pawl defines teeth 41 adapted to engage thread 42 of threaded portion 34 in advancing the carrier 12, as will be brought out more fully hereinafter. The pawl is biased to engage thread 42 by a coil spring 43 having one end 44 connected to the opposite end 45 of pawl 22, and an outer end 46 connected to a pin 47 having ends 48 received in a suitable groove 49 of body 11 adjacent closure plate 24, as shown in FIG. 4.

Spring 43 tends to urge the pawl to a position perpendicular to the axis 50 of member 25. Thus, in the carrier advancing arrangment of FIG. 3, teeth 41 of the pawl are urged into engagement with thread 42 of member 25 whereby rotation of the knob 19 in a direction tending to thread the member 25 to the left, as seen in FIG. 3, causes the carrier to advance to the left until such time as the teeth 41 are disposed outwardly of recess 36. In normal use, however, the threading of member 25 relative to the teeth 41 is discontinued upon completion of the cutting of the tube T with the carrier being disposed generally as shown in FIG. 3 short of the position in which the teeth 41 overlie recess 36. At this thime, the tube T is removed from the tool permitting further movement of the carrier and threaded member 25 to the left, as seen in FIG. 3, until the teeth 41 become aligned with recess 36 whereupon spring 43 urges the pawl to a substantially radial position relative to axis 50. Reverse movement of the carrier may now be effected by simply urging the carrier to the right, as seen in FIG. 3, relative to the body 11, whereupon the pawl pivots in a clockwise direction permitting the thread 42 to slide past teeth 41 until the threaded member 25 reaches the position wherein teeth 41 of the pawl overlie recess 35, whereupon spring 43 again positions the pawl substantially radially tp axis 50. In this retracted position, as shown in dotted lines in FIG. 1, the tool is now ready for a subsequent tube cutting operation. Thus, carrier 12 may now be urged to the left from the dotted line position of FIG. 1 to the full line position thereof by simply urging the carrier reversely to the left, as seen in FIGS. 1 and 3, until the cutter wheel 14 engages the tube T. During such movement, the pawl is firstly pivoted in a counterclockwise direction by its engagement with annular shoulder 37 and then further in a counterclockwise direction by its engagement with the thread 42 of threaded portion 34.

Upon reaching the position of FIG. 1, further advance of carrier 12 is effected by a threaded operation. Thus, knob 19 is rotated to cause threading of threaded portion 34 relative to pawl teeth 41 whereby carrier 12 is concurrently urged to the left with the threaded member 25.

The force of advance applied to the thread 42 reacts against the back side of the pawl teeth 41 so as to provide a wedging force against the teeth as a function of the resistance of the tube T to the cutting action of cutting wheel 14. This reaction force effects a frictional resistance to the threading action which provides a desirable automatic control of the tube cutting force generated by wheel 14 against tube T. At the same time, the wedging action tends to urge the bearing portions 32 and 33 of member 25 against the opposite surface of the carrier wall defining recess 26 providing further frictional resistance for automatically controlling the cutting force. As a result of such limitation of the cutting force, lockup of the cutter wheel on the tube is effectively prevented, thereby facilitating automatically the cutting operation and reducing maintenance of the tool. Further, as indicated above, deformation of the tube is effectively prevented, thereby avoiding flow restriction and the like in the cut tube.

In the illustrated embodiment, the angle of the pawl 22, relative to the axis 50 of member 25, may be approximately 60° to provide the desirable controlled reaction force. It has been found that with such an angle the tube cutter is well adapted for use with relatively hard tubes, such as steel tubes.

As indicated briefly above, the wedging force during the threaded advancement of the cutter wheel may tend to urge the threaded member 25 radially away from the pawl and against the opposite wall of carrier 12. Bearing portions 32 and 33 prevent digging in of the thread 42 into the opposite wall portion and provide a controlled frictional resistance to the rotation of the threaded member, as discussed above.

The invention further comprehends an improved arrangement of the backup rollers 15. Thus, as shown in FIG. 2, the backup rollers may be provided with an annular groove 51 aligned with cutter wheel 14. Groove 51 has a sufficient width to receive any burr raised by the cutting action of wheel 14 against the outer surface of tube T so as to prevent closing of the burr as the tool is rotated about the axis of tube T in the normal tube cutting operation. This assures that the cutting edge of the wheel 14 does not bind in the groove being cut through the tube wall and facilitates the tube cutting operation.

As will be further obvious to those skilled in the art, groove 51 permits the use of the tool with small diameter tubing as the cutting edge of the cutter wheel 14 may be received within the groove 51 at the extreme forward positioning of the carrier 12 wherein the pawl moves into the recess 36. Thus, the groove cooperates with the pawl in the automatic repositioning of the pawl at the extreme inward movement of the cutter wheel to provide an improved tube cutting action.

The tube cutter of the present invention provides an improved quick release mechanism permitting the user to move the cutting wheel quickly to and from the cutting position while automatically effecting a repositioning of the pawl at the opposite ends of the travel of the cutter wheel carrier so as to eliminate the need for manual operating means as is required in the quick release mechanisms of the prior art.

The foregoing disclosure of specific embodiments is illustrative of the broad inventive concepts comprehended by the invention.

I claim:

1. In a manually operable tool having a movably element, a mounting element, and a carrier movable carried on the mounting element for positionably adjustably carrying the working element, means defining a helical thread carried by said carrier, manually rotatable means for rotating said thread means about the helical axis thereof, and pawl means having a toothed portion engageable with said helical thread, the improvement comprising:

pivot means pivotally mounting said pawl means to said mounting element adjacent said helical thread means;

biasing means engaging said pawl means for biasing said pawl means to urge said toothed portion into mated association with said helical thread, the pivot axis of said pivot means being spaced from said helical thread means a preselected distance to cause said pawl means toothed portion in a forwardly angled position to drivingly engage said helical thread when the helical thread means is moved in a first axial direction and permit said helical thread to move past said toothed portion when the helical thread means is moved in a second, opposite axial direction, and in a rearwardly angled position to permit said helical thread to move past said toothed portion when the helical thread means is moved in said first axial direction; and means at opposite ends of said helical thread defining a space into which said biasing means urges said toothed portion of the pawl means to permit initial movement of the helical thread against said toothed portion in the space to pivot the pawl means against the action of the biasing means to permit a continuation of that movement to cause movement of the helical thread past the toothed portion of the thusly pivoted pawl means.

2. The tool structure of claim 1 wherein said spaces are defined by annular recesses coaxially in said helical thread means.

3. The tool structure of claim 1 wherein said helical thread means comprises an elongated member slidably carried by said carrier.

4. The tool structure of claim 1 wherein said biasing means comprises a spring urging said pawl means to a disposition substantially perpendicular to the axis of said helical thread.

5. The tool structure of claim 1 wherein said toothed portion comprises an end portion of the pawl means.

6. The tool structure of claim 1 wherein said pawl means comprises an elongated pawl member having opposite ends, said toothed portion being at one end, and said biasing means comprises a coil spring connected between said mounting element and the other pawl member end.

7. A tube cutter tool comprising:

a body having a carrier portion and a support portion spaced from said carrier portion and defining means for backing up a tube to be cut by said cutter tool;

a holder slidably carried by said carrier portion and carrying a cutter wheel for movement selectively inwardly toward and outwardly from said backup means;

a feed screw carried by said holder for axially fixed rotation thereon about an axis extending in the direction of said holder movement, said feed screw having a circumferential threaded portion, a first annular recess at the inner end of said threaded portion, and a second annular recess at the outer end of said threaded portion;

a pawl having a toothed end;

means mounting said pawl to said body for rotation about an axis with said toothed end adjacent said feed screw; and means engaging said pawl for biasing the pawl to urge said toothed end into threaded engagement with said feed screw threaded portion for causing axial movement of the feed screw and carrier as an incident of rotation of the feed screw, said biasing means urging said toothed end into said annular recesses at opposite extremes of axial movement of said feed screw to permit said pawl to be rotated by axial movement of the threaded portion against said toothed end to provide a fast, non-threading feed of the cutter wheel toward and away from said backup means.

8. The tube cutter tool of claim 7 wherein said toothed end extends at an acute angle to a radius therethrough from said pawl axis.

9. The tube cutter tool of claim 7 wherein said pawl extends from said pawl axis at an angle of approximately 60° to said feed screw axis.

10. The tube cutter tool of claim 7 wherein said feed screw threaded portion comprises a standard V-thread portion.

11. The tube cutter tool of claim 7 wherein said biasing means comprises a tension spring connected between said pawl and said body.

12. The tube cutter tool of claim 7 wherein said feed screw includes slide surfaces engaging said holder for supporting the feed screw therein, said pawl and feed screw threaded portion being arranged to cause an increase in friction between said slide surfaces and said holder as an incident of forcible engagement of the cutter wheel with a tube to be cut supported by said backup means.

13. The tube cutter tool of claim 7 wherein said feed screw includes slide surfaces engaging said holder for supporting the feed screw therein, said pawl and feed screw threaded portion being arranged to cause a suitable increase in friction between said slide surfaces and said holder as an incident of forcible engagement of the cutter wheel with a tube to be cut supported by said backup means thereby to limit the force of penetration of the cutter wheel into the tube for preventing lockup of the cutter wheel against the tube.

14. The tube cutter tool of claim 7 wherein said biasing means urges said pawl toward a position wherein a radius from said pawl axis through said toothed end extends perpendicular to said axis of the feed screw.

15. The tube cutter tool of claim 7 wherein said feed screw is mounted with said holder, and said holder is provided with an open portion for extension of the pawl therethrough.

16. The tube cutter tool of claim 8 wherein said means for backing up a tube defines a surface against which the tube is abutted by the force of the cutter wheel against the tube during the cutting operation, said surface having a recess aligned with the cutter wheel for receiving any burr raised on the tube by the action of the cutter wheel thereby to prevent reclosing of the groove by deformation of such burr by the surface means into the groove, said surface means being abutted by the tube at opposite sides of said recess.

17. The tube cutter tool of claim 16 wherein said surface means comprises a roller and said recess comprises an annular groove in said roller.

18. The tube cutter tool of claim 16 wherein said recess has a width greater than the thickness of said cutter wheel.

19. The tube cutter tool of claim 16 wherein said recess has a width greater than the thickness of said cutter wheel, said cutter wheel extending into said recess in an advanced disposition thereof.

20. The tube cutter tool of claim 16 wherein said surface means comprises a pair of rollers and said recess comprises an annular groove in each roller.

* * * * *